Feb. 15, 1927. 1,617,785
W. W. ALLABOUGH
METHOD OF PREVENTING THE WILTING OF LEAVES AND FLOWERS
Filed Nov. 27, 1925
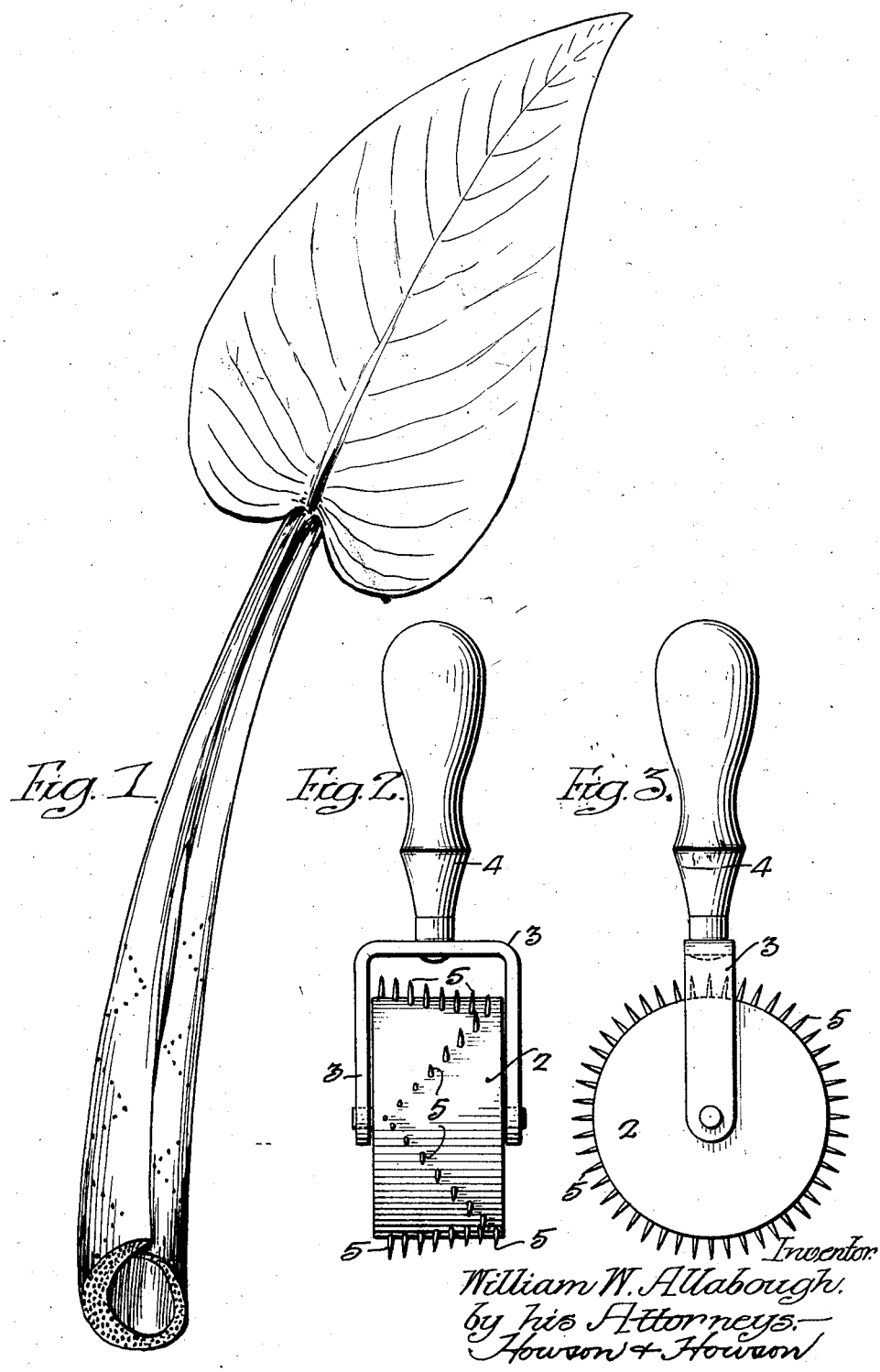

Patented Feb. 15, 1927.

1,617,785

UNITED STATES PATENT OFFICE.

WILLIAM W. ALLABOUGH, OF SILVERDALE, PENNSYLVANIA.

METHOD OF PREVENTING THE WILTING OF LEAVES AND FLOWERS.

Application filed November 27, 1925. Serial No. 71,767.

The object of my invention is to so treat the stems of leaves and flowers that the cut leaves and flowers will remain fresh and in their natural position for a much longer time.

This invention is especially applicable to heavy leaves, which ordinarily droop and wilt very quickly after they are cut and stand in water for a short length of time.

In the accompanying drawing:

Fig. 1 is a view of a calla-lily and its stem illustrating my invention;

Fig. 2 is a front view of a roller tool used in carrying out my improved process; and Fig. 3 is a side view of the roller tool.

In carrying out the improved process, the stem of the leaf or flower is punctured at intervals, in order to pierce the cambium tissue, which is formed between the wood and the outer skin or bark of the stem. This tissue is made up of a number of cells. The piercing of the cells of the tissue assists capillary attraction, as the punctures are so close together as to cause the water, in which the stem of the leaf is placed, to carry the sugar to the body of the leaf, and as long as this process continues, the leaf will remain fresh in its natural upright position.

In carrying out my invention, I prefer to use the tool shown in Figs. 2 and 3.

The roller 2 is rotatably mounted in a frame 3 having a suitable handle 4. The pins 5 project radially from the roller and are preferably placed in zig-zag formation, as shown in Fig. 2. One set of pins is preferably staggered in respect to an adjoining set of pins, so as to insure the correct piercing of the cells.

The leaf can be placed on a table and the roller drawn over that portion of the stem that is to be submerged in water, so as to puncture the stem in the manner shown in Fig. 1. In this instance, two lines of perforations are shown, but it will be understood that a single line of perforations may be formed, or more than two, depending upon the size of the stem and the character of the leaf.

I have found that by my process, a calla-lily leaf will remain fresh for a number of days. Calla-lily leaves usualy wilt within twenty-four hours, and have to be frequently renewed if used as decorations with the flowers.

I claim:

1. The process herein described of prolonging the freshness of leaves and flowers, said process consisting in puncturing the stem of the leaf or flower longitudinally, said punctures piercing the cambium tissue, the punctures being arranged close together so as to cause the water in which the stem of the leaf or flower is placed to penetrate the stem and to carry the sugar in the cambium tissue to the body of the leaf or flower.

2. The process herein described of prolonging the freshness of leaves and flowers, said process consisting in puncturing the stem of the leaf or flower in a zig-zag line throughout a portion of its length, said punctures piercing the cambium tissue, the punctures being arranged close together so as to cause the water in which the stem of the leaf or flower is placed to penetrate the stem and to carry the sugar in the cambium tissue to the body of the leaf or flower.

WILLIAM W. ALLABOUGH.